US010005566B2

(12) United States Patent
Cahill (10) Patent No.: US 10,005,566 B2
(45) Date of Patent: Jun. 26, 2018

(54) SYSTEMS AND METHODS FOR DETECTION OF DRAGGING BRAKE (71) Applicant: Goodrich Corporation, Charlotte, NC (US)

(72) Inventor: Eric Daniel Cahill, Troy, MI (US)

(73) Assignee: GOODRICH CORPORATION, Charlotte, NC (US)

(*) Notice: Subject to any disclaimer, the term of this patent is extended or adjusted under 35 U.S.C. 154(b) by 61 days.

(21) Appl. No.: 15/180,663

(22) Filed: Jun. 13, 2016

(65) Prior Publication Data
US 2017/0355473 A1 Dec. 14, 2017

(51) Int. Cl.
B64F 5/60 (2017.01)
B64C 25/34 (2006.01)
B64D 45/00 (2006.01)
B60T 17/22 (2006.01)
B64C 25/42 (2006.01)

(52) U.S. Cl.
CPC .............. B64F 5/60 (2017.01); B60T 17/221 (2013.01); B64C 25/34 (2013.01); B64C 25/42 (2013.01); B64D 45/00 (2013.01); B64D 2045/0085 (2013.01)

(58) Field of Classification Search
CPC ...... B64F 5/0045; B60T 17/221; B64C 25/34; B64C 25/42; B64D 45/00; B64D 2045/0085
See application file for complete search history.

(56) References Cited

U.S. PATENT DOCUMENTS

| 8,102,280 B2 | 1/2012 | Cahill |
| 8,666,625 B1 | 3/2014 | Georgin |
| 8,843,254 B2 | 9/2014 | Cahill et al. |
| 2014/0131514 A1 | 5/2014 | Cook |

FOREIGN PATENT DOCUMENTS

| FR | 1033176 | 7/1953 |
| GB | 565052 | 10/1944 |
| GB | 1040424 | 8/1966 |

OTHER PUBLICATIONS

EP Search Report dated Nov. 20, 2017 in EP Application No. 17176442.6.

Primary Examiner — Jerrah Edwards
Assistant Examiner — Mathew Franklin Gordon
(74) Attorney, Agent, or Firm — Snell & Wilmer L.L.P.

(57) ABSTRACT

A landing gear assembly may include a first wheel and a second wheel, a first wheel sensor coupled to the first wheel and a second wheel sensor coupled to the second wheel, and a controller coupled to the first wheel sensor and the second wheel sensor. A tangible, non-transitory memory may have instructions for detecting a dragging brake. The controller may perform operations including receiving data from the first wheel sensor and the second wheel sensor, calculating a wheel speed characteristic for each of the first wheel and the second wheel based on the data, identifying a lowest value for the wheel speed characteristic, determining a moving average for the wheel speed characteristic, comparing the lowest value to the moving average, and whether the lowest value for the wheel speed characteristic indicates a dragging brake.

18 Claims, 8 Drawing Sheets

SYSTEMS AND METHODS FOR DETECTION OF DRAGGING BRAKE

FIELD

The present disclosure relates to aircraft systems, and, more specifically, to aircraft landing gear systems.

BACKGROUND

Aircraft often include one or more landing gear that comprise one or more wheels. Each wheel may have a brake that is operatively coupled to the wheel to slow the wheel, and hence the aircraft, during, for example, landing or a rejected takeoff. Aircraft brakes are not typically engaged voluntarily during takeoff, as brake engagement would act to impede forward motion of the aircraft. However, in the event of brake malfunction, one or more brakes may be at least partially engaged during a takeoff. Such engagement may not be enough to affect the ability of the aircraft to takeoff, and indeed, may be undetectable to the aircraft pilot and crew. In other cases, a dragging brake may prevent an aircraft from achieving takeoff speed. A pilot may elect to reject the takeoff in response to a dragging brake. A concern is that partial engagement of an aircraft brake during takeoff tends to generate heat in the brake, as the brake absorbs energy from the rotation of the wheel and thus increases in temperature. Partial engagement of an aircraft brake during takeoff may also prevent the aircraft from reaching an appropriate takeoff speed.

After take-off, landing gear may be stowed by retracting the landing gear into a wheel well of an airframe. During retraction, the wheel may or may not be rotating. Typically, the braking system may be commanded to apply braking pressure to the wheels in order to slow or stop the wheel rotation before, during, and/or after retraction into the aircraft body. A brake that is at least partially engaged at a time when no braking is commanded may be referred to as a "dragging" brake. If a brake drags during takeoff, it is not desirable to retract the wheel into the wheel well after takeoff due to the excess temperature of the brake. Retraction of a hot brake may pose a fire hazard and/or cause the tire to become too hot and fail.

SUMMARY

Systems and methods disclosed herein may be useful for detecting a dragging brake. In this regard, a landing gear assembly may include a first wheel and a second wheel, a first wheel sensor coupled to the first wheel and a second wheel sensor coupled to the second wheel, and a controller coupled to the first wheel sensor and the second wheel sensor. A tangible, non-transitory memory may have instructions for detecting a dragging brake. The controller may perform operations including receiving data from the first wheel sensor and the second wheel sensor, calculating a wheel speed characteristic for each of the first wheel and the second wheel based on the data, identifying a lowest value for the wheel speed characteristic, determining a moving average for the wheel speed characteristic, comparing the lowest value to the moving average, and whether the lowest value for the wheel speed characteristic indicates a dragging brake.

In various embodiments, the operations may further include determining, by the controller, an average wheel speed characteristic for a present takeoff, wherein the lowest value is excluded from the average, and storing, by the controller, the average wheel speed characteristic for the present takeoff, wherein the moving average is based on the average wheel speed characteristic for the present takeoff and is based on a stored average wheel speed characteristic from a past takeoff. The operations may further include evaluating, by the controller, the lowest value and the moving average against a threshold, wherein the threshold is based on the moving average. The threshold may be 50% to 70% of the moving average. The data may include a displacement, velocity, or acceleration, and the wheel speed characteristic may be a summation of the data during a time interval. The time interval may begin after takeoff and may end prior to a gear retract braking. The operations may further include generating, by the controller, a signal based on the dragging brake being present.

An article of manufacture may include a non-transitory, tangible computer readable storage medium having instructions stored thereon that, in response to execution by a controller, cause the controller to perform operations. The operations may include calculating, by the controller, a wheel speed characteristic for a first wheel and a second wheel. The operations may include identifying, by the controller, a lowest value for the characteristic. The operations may include determining, by the controller, a moving average for the characteristic. The operations may include comparing, by the controller, the lowest value to the moving average. The operations may include determining, by the controller, whether the lowest value for the wheel speed characteristic indicates a dragging brake.

In various embodiments, the operations may further include determining, by the controller, an average wheel speed characteristic for a present takeoff, wherein the lowest value is excluded from the average, and storing, by the controller, the average wheel speed characteristic for the present takeoff, wherein the moving average is based on the average wheel speed characteristic for the present takeoff and is based on a stored average wheel speed characteristic from a past takeoff. The operations may further include evaluating, by the controller, the lowest value and the moving average against a threshold, wherein the threshold is based on the moving average. The threshold may be 50% to 70% of the moving average. The wheel speed characteristic may be a summation of an angular velocity during a time interval. The time interval may begin after takeoff and may end prior to a gear retract braking.

A method for detecting a dragging brake may comprise the steps of receiving, by the controller, data from a first wheel sensor and a second wheel sensor, calculating, by the controller, a wheel speed characteristic for each of a first wheel and a second wheel based on the data, identifying, by the controller, a lowest value for the wheel speed characteristic, determining, by the controller, a moving average for the wheel speed characteristic, comparing, by the controller, the lowest value to the moving average, and determining, by the controller, whether the lowest value for the wheel speed characteristic indicates a dragging brake.

In various embodiments, the method may further include determining, by the controller, an average wheel speed characteristic for a present takeoff, wherein the lowest value is excluded from the average, and storing, by the controller, the average wheel speed characteristic for the present takeoff, wherein the moving average is based on the average wheel speed characteristic for the present takeoff and is based on a stored average wheel speed characteristic from a past takeoff. The method may further include evaluating, by the controller, the lowest value and the moving average against a threshold, wherein the threshold is based on the moving average. The threshold may be 50% to 70% of the moving average. The wheel speed characteristic may be a summation of an angular velocity during a time interval. The time interval may begin after takeoff and may end prior to a gear retract braking. The method may further include generating, by the controller, a signal based on the dragging brake being present.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft. As used herein, "forward" refers to the direction associated with the nose (e.g., the front end) of an aircraft, or generally, to the direction of flight or motion.

Systems and methods disclosed herein may be useful for detecting a dragging brake. Aircraft may comprise one or more types of aircraft wheel and brake assemblies. For example, an aircraft wheel and brake assembly may comprise a non-rotatable wheel support, a wheel mounted to the wheel support for rotation, and a brake disk stack. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk pack and a brake head may be located at the front end. The brake head may house one or more actuator rams that extend to compress the brake disk stack against the back plate, or the brake disk stack may be compressed by other means. Torque is taken out by the stator disks through a static torque tube or the like.

The actuator rams may be electrically operated actuator rams or hydraulically operated actuator rams, although some brakes may use pneumatically operated actuator rams. In brake systems that employ fluid powered (hydraulic or pneumatic power) actuator rams, the actuator ram may be coupled to a power source via a brake servo valve (BSV) and a shutoff valve (SOV). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, anti-skid logic) controls the amount of fluid pressure provided to the actuator ram, and thus, the braking force applied to the wheel. To prevent or minimize unintentional braking (e.g., due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram, and thus, braking cannot be effected.

In electronic brakes, a brake controller (or controller) is coupled to one or more electromechanical actuator controllers (EMAC) for a brake, which drives one or more electromechanical brake actuators. The brake controller may be in communication with a brake pedal, and thus may control the EMAC in accordance with pilot/copilot braking commands. In various aircraft, other means are used to compress a brake disk stack. A brake controller may comprise a processor and a tangible, non-transitory memory. The brake controller may comprise one or more logic modules that implement brake logic. In various embodiments, the brake controller may comprise other electrical devices to implement brake logic.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

Figure 1:
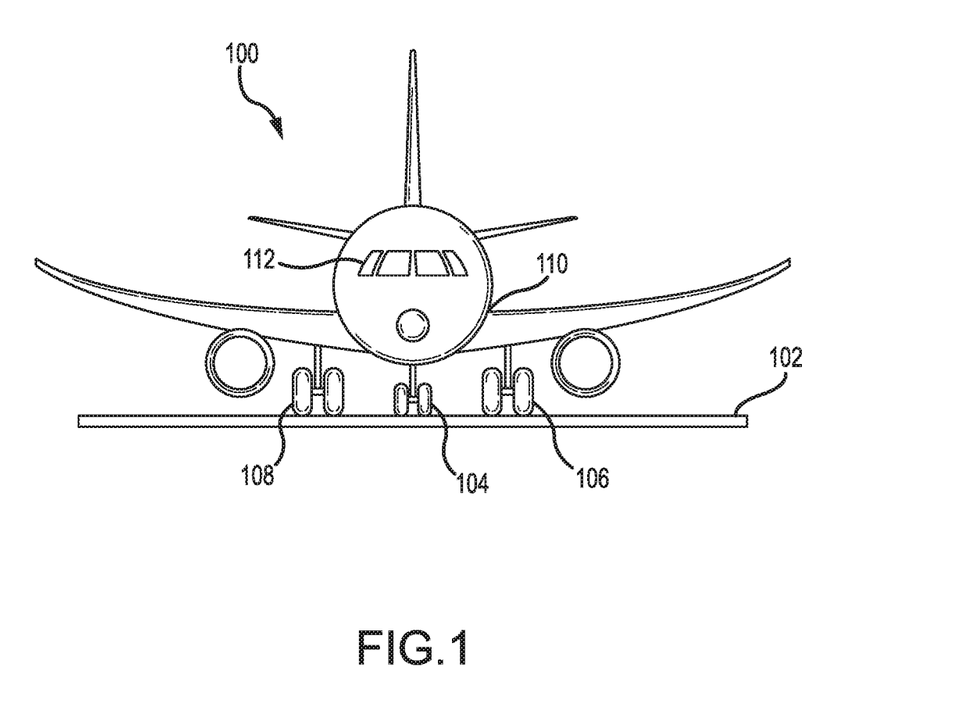
FIG. 1 illustrates an aircraft in accordance with various embodiments.

With reference to FIG. 1, aircraft 100 on runway 102 is shown. Aircraft 100 may comprise right landing gear 108 and left landing gear 106. Nose landing gear 104 is located under the nose of aircraft 100 and may not include a brake. Aircraft 100 may comprise a controller 110 and a pilot notification system 112. Aircraft 100 may include sensors that detect aircraft status information. Aircraft status information may mean any information relating to the status of an aircraft, for example, the presence of weight on wheels, aircraft velocity, aircraft acceleration, wheel position, wheel velocity, wheel acceleration, air temperature, the pressure applied to the brake stack during braking, global positioning system coordinates, and the like. A brake system may have access to various aircraft status information at any given time.

Figure 2:
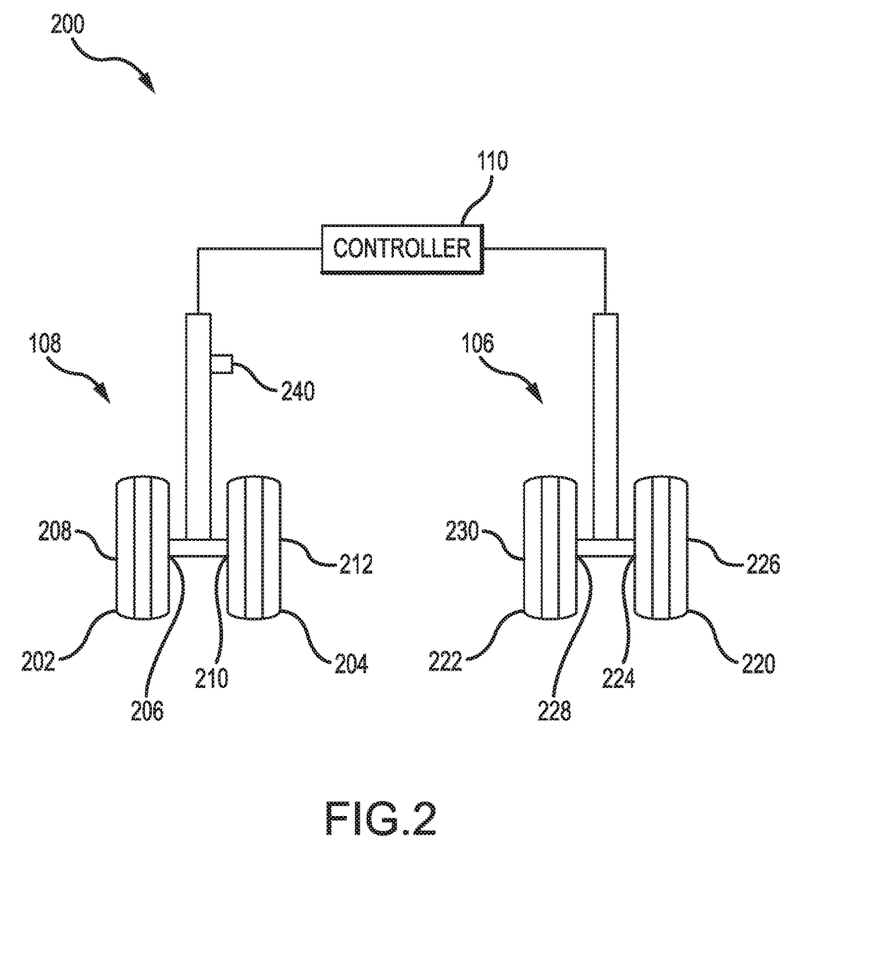
FIG. 2 illustrates a landing gear of the aircraft shown in FIG. 1, in accordance with various embodiments.

With reference to FIG. 2, landing gear assembly 200 is shown in a front view, looking forward to aft, in accordance with various embodiments. Landing gear assembly 200 may comprise right landing gear 108 and left landing gear 106. Right landing gear 108 may comprise a plurality of wheels, such as a right outboard wheel 202 and a right inboard wheel 204. Right outboard wheel 202 may comprise a right outboard brake 206, and right inboard wheel 204 may comprise a right inboard brake 210. Right outboard brake 206 and right inboard brake 210 may be mounted in a conventional manner to right outboard wheel 202 and right inboard wheel 204, respectively, to apply and release braking force on a rotatable each respective wheel. Right landing gear 108 may further comprise a plurality of sensors, which may include a right outboard (ROB) wheel sensor 208 and a right inboard (RIB) wheel sensor 212. ROB wheel sensor 208 and RIB wheel sensor 212 may be coupled to each respective wheel to measure one or more characteristics of each wheel, such as wheel position, wheel speed, and/or wheel acceleration, measured in terms of linear or angular position, linear or angular velocity, linear or angular acceleration, or other measurement unit.

Left landing gear 106 may comprise a plurality of wheels, such as a left outboard wheel 220 and a left inboard wheel 222. Left outboard wheel 220 may comprise a left outboard brake 224, and left inboard wheel 222 may comprise a left inboard brake 228. Left outboard brake 224 and left inboard brake 228 may be mounted in a conventional manner to left outboard wheel 220 and left inboard wheel 222, respectively, to apply and release braking force on a rotatable each respective wheel. Left landing gear 106 may further comprise a plurality of sensors, which may include a left outboard (LOB) wheel sensor 226 and a left inboard (LIB) wheel sensor 230. LOB wheel sensor 226 and LIB wheel sensor 230 may be coupled to each respective wheel to measure one or more characteristics of each wheel, such as wheel position or displacement, wheel speed, and/or wheel acceleration, measured in terms of linear or angular position, linear or angular velocity, linear or angular acceleration, or other measurement unit. In various embodiments, wheel sensors 226, 230, 208, 212 may comprise wheel speed sensors that output signals indicative of angular velocity or angular displacement, for example, a Hall effect sensor, variable resistance sensor, or the like.

The configuration of landing gear assembly 200 is used for example only as aircraft may comprise multiple landing gear and/or multiple wheels and brakes. For example, a landing gear may comprise from one to six or more wheels, and a landing gear assembly may comprise from two to twenty or more wheels. Each landing gear 106, 108 may comprise a structure, for example a strut, bogie beam, axle and/or other structure, coupled to one or more wheels of the landing gear. When the aircraft is on the ground, the weight of the aircraft is transferred through the landing gear to the one or more axles and finally to the one or more wheels. In various embodiments, left landing gear 106 and/or right landing gear 108 further comprises a weight-on-wheels (WOW) sensor 240 configured to detect whether the aircraft is on the ground. After takeoff, for example, a WOW sensor 240 may indicate there is no weight on wheels, thus indicating that the aircraft is in flight, i.e. weight is off wheels, which may be referred to as "weight-off-wheels" (WOFFW).

After takeoff, WOW sensor 240 may change from an on-ground state to an in-flight state, and thereafter, a gear retract command may be issued to bring the landing gear within the aircraft fuselage. Gear retract braking may be used to decelerate the wheels before fully retracting landing gear 106, 108 into the bay within the aircraft fuselage. Gear retract braking may comprise a braking technique which assists the deceleration of the wheels of the aircraft by providing additional braking to the wheels after takeoff. Gear retract braking may begin after the aircraft wheels are no longer in contact with the ground.

During a period of time after the aircraft changes to an in-flight state until gear retract braking being applied, the wheels begin to decelerate, or "spindown." The natural deceleration of the wheels during this time period may be influenced by factors such as the ambient temperature, level of wear on the tire and/or brakes, size and inertia of the wheels, and/or other aircraft characteristics or environmental factors.

Landing gear assembly 200 may further comprise controller 110 and wheel sensors 208, 212, 230, 226. Controller 110 is illustrated in electronic communication (e.g., wired or wirelessly coupled) with right landing gear 108 and left landing gear 106. Controller 110 may operate to receive information from wheel sensors 208, 212, 230, 226, which measure a characteristic of wheels 202, 204, 222, 220, and to determine a performance of brakes 206, 210, 228, 224. In various embodiments, the controller 110 may include or communicate with one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

Figure 3A:
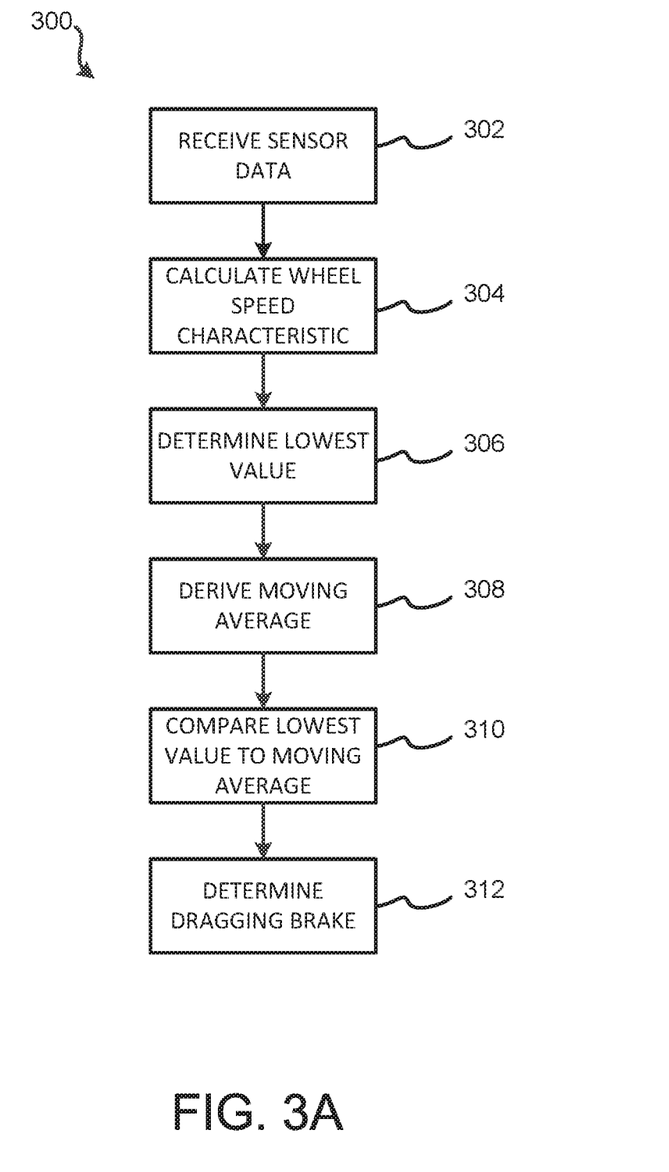
FIG. 3A illustrates a method of detecting a dragging brake, in accordance with various embodiments.

With reference to FIG. 3A, a method 300 for determining or detecting a dragging brake is shown, in accordance with various embodiments. Controller 110 may be capable of carrying out the steps of FIG. 3A. Generally, method 300 may be initiated after WOW sensor 240 of landing gear indicates that weight is off wheels, i.e. WOFFW is true. Further, method 300 may be completed prior to the start of gear retract braking. Method 300 may be performed by controller 110 and may include the steps of receiving sensor data (step 302), calculating a wheel speed characteristic (step 304), determining a lowest value (step 306), deriving a moving average (step 308), comparing the lowest value to the moving average (step 310), and determining a dragging brake (step 312).

Step 302 of method 300 may comprise receiving an input of sensor data from one or more sensors, such as WOW sensor 240 and wheel sensors 208, 212, 226, 230. Wheel sensors 208, 212, 230, 226 may detect and/or record a series of measurements about the wheels, where the measurements may correlate to wheel speed for each wheel. In various embodiments, wheel sensors 208, 212, 226, 230 may detect the speed, acceleration, displacement and/or position of wheels 202, 204, 222, 220, respectively, or may measure or detect other characteristics of the wheels. For example, wheel sensors 208, 212, 226, 230 may include wheel speed transducers to measure wheel speed directly as an angular or rotational velocity, such as rotations per minute (RPM) or radians per second (rad/s). Data from the sensors may be further processed by controller 110 to calculate the wheel speed characteristic to be used to detect a dragging brake.

Step 304 of method 300 may comprise calculating a wheel speed characteristic of each wheel by determining a wheel speed, i.e., angular velocity, of each of wheels 202, 204, 222, 220 based on sensor measurements and by further processing the wheel speed, for example, by summation, integration, or the like, into the wheel speed characteristic. In various embodiments, wheel sensors 208, 212, 226, 230 may measure angular displacement of wheels 202, 204, 222, 220, respectively. A measurement of angular displacement over time allows controller 110 to calculate wheel speed (the scalar of angular velocity). The acceleration of a wheel may also be derived based on the angular velocity or wheel speed over time. Step 304 may comprise a step of filtering or conditioning the data from the sensors. Conditioning of data may be realized by summation, integration and/or other filtering method. Step 304 may comprise calculating a sum of the sensor measurements or conditioned sensor measurements over a time interval to obtain a value for each wheel, wherein the value represents the wheel characteristic, which may be expressed as a magnitude of the total wheel displacement during the time interval. In various embodiments, the wheel speed characteristic may comprise, for example, a filtered measurement of angular velocity, such as an integral or sum of angular velocity over a time interval. In various embodiments, the time interval may begin after takeoff and may end prior to a gear retract braking. The time interval may end at the time when the last wheel of the landing gear stops spinning, i.e., reaches a wheel speed of zero ($\omega=0$).

In various embodiments, step 304 may comprise calculating a time duration for each wheel to "spindown" until the wheel speed is zero, wherein the wheel speed characteristic may comprise a wheel spindown duration or a wheel stop time. Step 304 may comprise determining a wheel speed at a selected time point, wherein the wheel speed characteristic may comprise angular velocity of a wheel or wheel speed. Step 304 may further comprise selecting a time point based on a spindown duration or a stop time of one or more wheels. For example, the selected time point may be a time Ti that a first wheel reaches a wheel speed of zero, a time $T_f$ that a final wheel reaches a wheel speed of zero or a time that any wheel of the landing gear reaches a wheel speed of zero.

Step 306 of method 300 may comprise determining the lowest calculated value of the wheel speed characteristic by comparing the values for each wheel, measured and/or calculated during the present takeoff (or takeoff event), to identify the lowest value of the wheel speed characteristic. The lowest value of the wheel speed characteristic may include the lowest wheel speed at a selected time point, the lowest wheel speed sum or integral over a time interval, the shortest time for the wheel speed to reach zero, or other characteristic. In various embodiments, the lowest value includes a time duration for one of the plurality of wheels to reach a wheel speed of zero. In various embodiments, the lowest value includes a wheel speed of zero ($\omega=0$).

Step 308 of method 300 may comprise deriving a moving average of any of the non-lowest calculated values of the wheel speed characteristic by selecting a subset of the calculated values from step 304 of the present takeoff and averaging the subset of the calculated values. In various embodiments, the subset of calculated values excludes the lowest calculated value identified in step 306. The subset of calculated values may further exclude other calculated values, such as the highest value, a plurality of lowest values, a plurality of highest values, or other values. From the remaining sums, excluding the lowest value, the remaining values may be averaged to find an average wheel speed characteristic for the present takeoff, i.e., a present average of the wheel speed characteristics.

In various embodiments, after determining a time $T_i$ that one of the plurality of wheels reaches a wheel speed of zero, step 308 may include averaging a wheel speed characteristic of the remaining wheels of the plurality of wheels. The average wheel speed characteristic may include an average time duration for the wheels to reach a wheel speed of zero or may include an average wheel speed at time $T_i$.

Step 308 may further include selecting a set of average wheel speed characteristics stored from past takeoffs, and using the past averages and the present average to calculate a new average, i.e., a moving average of the wheel characteristic. In various embodiments, stored averages from the five (5) to fifteen (15) most recent past takeoffs from the aircraft may be averaged with the present average to calculate the moving average. Stored averages from past takeoffs by the aircraft may be selected based on the age of the stored average data. For example, stored averages from past takeoffs may be included in the moving average calculation unless the stored average was recorded before a threshold date or time cutoff, in order to improve the accuracy of the moving average by including data from recent past takeoffs. At each takeoff, a new moving average may be derived using the subset of stored averages from recent takeoffs, wherein the oldest stored average in the subset is omitted and the new average from the present takeoff is included in each new moving average, such that the moving average may be updated with each new takeoff. In various embodiments, any number of stored averages from past takeoffs from the aircraft or other aircrafts may be included in the moving average.

Step 310 of method 300 may comprise comparing the lowest calculated value (from step 306) and the moving average (from step 308) to find a difference between the lowest calculated value and the moving average of the wheel characteristic. The difference may be expressed in terms of magnitude of the difference between the lowest value and the moving average, a percentage of the difference between the lowest value and the moving average, or other quantification or comparison of the lowest value, the moving average, past averages and/or the present average. The comparison or difference between the lowest value and the moving average may be further evaluated against a threshold. The threshold may be based, in part, on the moving average, past averages and/or the present average. The threshold may be further based on various information pertaining to the aircraft, such as weight, make, model, and aircraft brake system configuration.

In various embodiments, step 310 may include comparing an average time duration to the lowest value, which may be the shortest time duration for wheel to reach a wheel speed of zero. Step 310 may include comparing an average wheel speed to the lowest value, which may be zero at time $T_f$. The comparison or difference between the lowest value and the moving average may be further evaluated against a threshold.

Step 312 of method 300 may comprise determining a dragging brake by evaluating if the result of the comparison for the wheel characteristic, for example between the lowest calculated wheel value and the moving average, is outside the threshold. If the result is outside the threshold, then it can be concluded that a dragging brake is occurring, and if the result is inside the threshold, then it can be concluded that a dragging brake is not occurring. In response to detecting a dragging brake, controller 110 may send a notification signal to alert the presence of a dragging brake.

Figure 3B:
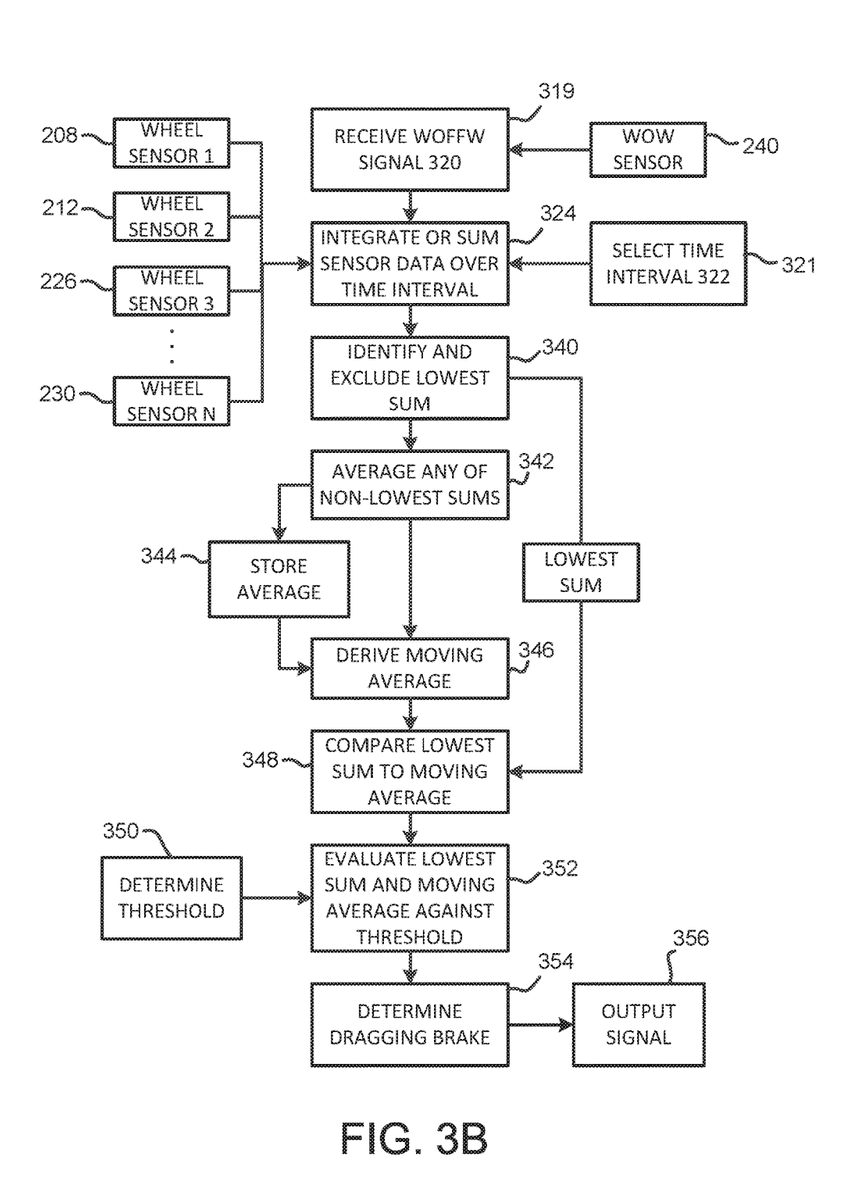
FIG. 3B illustrates a block diagram of a controller for dragging brake detection and a process of detecting a dragging brake, in accordance with various embodiments.

With reference to FIG. 3B, a functional diagram for dragging brake detection in a four-wheel landing gear assembly is shown, in accordance with various embodiments. The systems and methods disclosed may be useful in aircraft having any number of wheels. The steps in the functional diagram of FIG. 3B may be implemented by controller 110 (from FIG. 2). With continuing reference to FIG. 2 and FIG. 3B, controller 110 may continually receive information from wheel sensors 208, 212, 230, 226 and WOW sensor 240, such as prior to, during, and after takeoff. Controller 110 may be configured to perform dragging brake detection after takeoff and before the start of gear retract braking. After takeoff, WOW sensor 240 indicates that there is no longer WOW and the aircraft is in flight. Controller 110 may perform the steps of receiving a WOFFW signal 320 (step 319), selecting a time interval 322 (step 321), integrating or summing the sensor data over the time interval (step 324), identifying and excluding the lowest sum (step 340), averaging any of the non-lowest sums (step 342), storing the average (step 344), deriving a moving average (step 346), comparing the lowest sum to the moving average (step 348), determining a threshold (step 350), evaluating the lowest sum and the moving average against the threshold (step 352), determining a dragging brake (step 354), outputting a signal (step 356).

With reference to FIG. 3B, once controller 110 receives a WOFFW signal 320 from WOW sensor 240 (step 319), the process of detecting a dragging brake may begin. In step 321, controller 110 may select a time interval 322 for detecting a dragging brake. The time interval 322 may begin after the start of WOFFW signal 320 and may end prior to gear retract braking. Time interval 322 may end at the time the longest spinning wheel of the landing gear stops spinning, i.e., reaches a wheel speed of zero (w=0). Controller 110 may process the data received from wheel sensors 208, 212, 230, 226 during time interval 322 in order to determine if a dragging brake is present in the brakes for one or more wheels.

Figure 4:
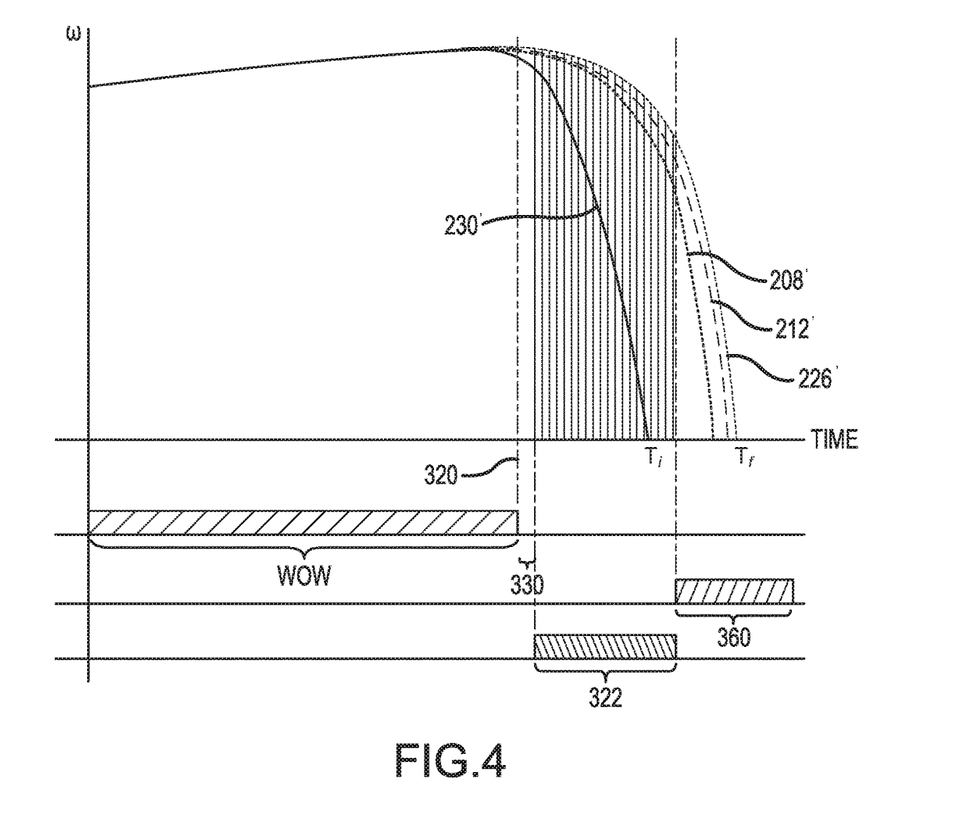
FIG. 4 illustrates a method of detecting a dragging brake using angular velocity, in accordance with various embodiments.

Referring now to FIG. 4 and still to FIG. 3B, information from each of wheel sensors 208, 212, 230, 226 is received, and may be filtered by controller 110, to obtain a wheel speed, i.e., an angular velocity, for each wheel. In various embodiments, after receipt of WOFFW signal 320, an integral or sum of the sensor data for each wheel may be calculated by controller 110 for the time interval 322 (step 324). Time interval 322 may be selected to be between receipt of WOFFW signal 320 and gear retract braking 360. Time interval 322 may be selected to be between receipt of WOFFW signal 320 and a time $T_f$ that the longest spinning wheel of the landing gear stops spinning, i.e., reaches a wheel speed of zero (w=0), which may be prior to or after gear retract braking 360. Step 324 may include a summation of the angular velocity over time interval 322, for example, to determine a sum of the data for each wheel during the time interval 322. The time interval 322 may start at any point after receipt of WOFFW signal 320. Time interval 322 may begin after a time delay 330 after receipt of WOFFW signal 320. In various embodiments, the angular velocity of each wheel may be integrated to find the integral of the angular velocity measurements during time interval 322, i.e. the area under each curve shown in FIG. 4, wherein the angular velocity sum correlates to the total displacement of the wheel during time interval 322. For example, step 324 may result in a value for each of wheels 202, 204, 222, 220, wherein the resulting value may be a magnitude of the sum of the angular velocity measurements for each wheel:

$$\sum_0^n \omega_{LOB}, \sum_0^n \omega_{LIB}, \sum_0^n \omega_{RIB}, \sum_0^n \omega_{ROB}$$

Where n is the time interval; and ω is angular velocity, such that $\omega_{LOB}$ is the angular velocity of left outboard wheel 220, $\omega_{LIB}$ is the angular velocity of left inboard wheel 222, $\omega_{ROB}$ is the angular velocity of right outboard wheel 202, and $\omega_{RIB}$ is the angular velocity of right inboard wheel 222.

In step 340, controller 110 may identify and extract the lowest angular velocity sum from the values resulting from step 324. In various embodiments, after determining the lowest angular velocity sum, the lowest sum may be extracted and/or segregated from the remaining sums. The lowest value may represent a wheel with the lowest velocity sum over the time interval 322, or stated differently, the lowest velocity sum may represent a wheel that completed the fewest rotations over the time interval 322, and thus may represent the wheel with the greatest deceleration. FIG. 4 shows wheel sensors 208, 212, 230, 226 having respective wheel velocity profiles 208', 212', 230', 226'. For illustration purposes, FIG. 4 shows wheel sensor 230 having a dragging brake velocity profile, shown by wheel velocity profile 230'. Summation of the angular velocity of wheel sensor 230 over time interval 322 would result in a lower sum than, for example, wheel sensors 208, 212, and 226 in FIG. 4. FIG. 3B shows that the lowest sum may be omitted from steps 342, 344 and 346.

In step 342, controller 110 may average the sums from the summation of angular velocity to determine an average angular velocity sum for the present takeoff. The lowest angular velocity sum identified in step 340 may be omitted from the calculation of the average angular velocity sum. In various embodiments, other angular velocity sums may be omitted from the average. For example, the average of the non-lowest angular velocity sums from summation of data from wheel sensors 208, 212, and 226 during the present takeoff may be represented as:

$$\omega_{Avg\,Sum_{new}} = \frac{\sum_{0}^{n}\omega_x + \sum_{0}^{n}\omega_y + \sum_{0}^{n}\omega_z}{3}$$

Where $\omega_{AvgSumNew}$ is the average of the non-lowest angular velocity sums for a takeoff, i.e., the average angular velocity sum; n is the time interval; $\omega_x$, $\omega_y$ and $\omega_z$ are angular velocity profiles for the non-lowest wheel velocities, where as illustrated in the example of FIG. 4, $\omega_x$, $\omega_y$, and $\omega_z$ may be angular velocity data from wheel sensors 208, 212, and 226.

Figure 5:
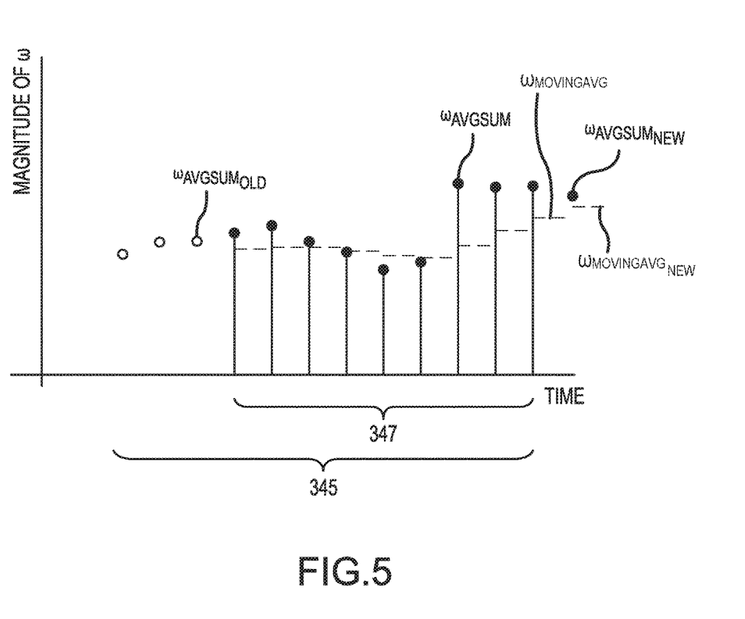
FIG. 5 illustrates further detail of a method of detecting a dragging brake using a moving average, in accordance with various embodiments.

Referring now to FIG. 5 and still to FIG. 3B, in step 344, the average angular velocity sum for the present takeoff may be stored by the controller 110 as stored data, such as stored average angular velocity sums 345 (FIG. 5). Controller 110 may contain stored data from previous or past takeoffs for the aircraft and/or other aircrafts, such as stored average angular velocity sums 345 (FIG. 5).

In step 346, a moving average may be derived from average angular velocity sums from the present takeoff and from past takeoffs, which also may be referred to as past or present "takeoff events." In step 346, a subset 347 of stored average angular velocity sums 345 may be selected to calculate the moving average. For illustration purposes, ten (10) average angular velocity sums are used to derive a moving average of the angular velocity sums. The ten (10) data points may include a subset 347 of nine (9) of the stored average angular velocity sums from the previous nine (9) takeoffs with one of the ten (10) data points including the average angular velocity sum for the present takeoff (from step 342). The nine (9) stored average angular velocity sums and the one (1) present average angular velocity sum may be used to derive a 10-event moving average. A 10-event moving average calculation of average angular velocity sum may be represented as:

$$\sum_{n+x}^{n+(x+10)} \omega_{Moving\,Avg} - \omega_{Avg\,Sum_{old}} + \omega_{Avg\,Sum_{new}}$$

In various embodiments, FIG. 5 illustrates the moving average calculation, where $\omega_{AvgSumOld}$ is the average angular velocity sum from the tenth previous takeoff, and where $\omega_{AvgSumNew}$ is the average angular velocity sum for the present takeoff, and $\omega_{MovingAvg}$ is the previous moving average for the angular velocity sums. In the calculation of a new moving average $\omega_{MovingAvgNew}$ shown in FIG. 5, $\omega_{AvgSumOld}$ is deleted from the new moving average calculation and $\omega_{AvgSumNew}$ is added into the new moving average calculation. Thus, a moving average for the aircraft landing gear, such as right landing gear 108, left landing gear 106, and/or landing gear assembly 200 (from FIG. 2), may be updated with a new moving average calculation after each takeoff.

Referring again to FIG. 3B, the lowest angular velocity sum (from step 340) may be compared to the new moving average (from step 346). In step 348, comparing the lowest angular velocity sum to the new moving average may comprise determining a variation, deviation, or a difference between the lowest sum and the new moving average. A large difference between the lowest angular velocity sum and the new moving average may indicate a dragging brake. The comparison may be represented generally as:

$$\omega_{lowest\,sum} << \omega_{RollingAvg_{new}}$$

Where $\omega_{LowestSum}$ is the lowest angular velocity sum from the present takeoff; and $\omega_{MovingAvgNew}$ is the new 10-event moving average calculation.

In step 352, the comparison of lowest angular velocity sum and moving average may be evaluated against a threshold. An angular velocity sum beyond a given threshold value may indicate a dragging brake. The threshold may be predetermined, in part, and may further be based on the new moving average. In step 350, threshold may be determined based upon aircraft size, weight, engine power, brake type, brake size, and/or other suitable factors. In various embodiments, the threshold may be a minimum percentage of the moving average. In various embodiments, a threshold value may range from about 40% to 70% of the moving average, more preferably from about 50% to about 70% of the moving average and more preferably from about 50% to about 60% of the moving average, wherein "about" in this context only means+/−5%. A threshold based on a predetermined value of 50% of the moving average may be represented as:

$$\omega_{lowest\,sum} < \frac{1}{2} \cdot \omega_{Moving\,Avg_{new}}$$

Where $\omega_{LowestSum}$ is the lowest angular velocity sum from the present takeoff; and $\omega_{MovingAvgNew}$ is the new 10-event moving average.

In step 354, a dragging brake may be determined if the lowest angular velocity sum is outside the threshold. For example, if the lowest angular velocity sum is less than 50% of the new moving average, the lowest angular velocity sum is outside the threshold and may indicate a dragging brake. Thus, a wheel speed characteristic that falls below the minimum threshold value, for example of 50% of the moving average, may indicate that a dragging brake is present. A threshold based on the moving average for an aircraft may better account for the condition of the tires and brakes.

Figure 6:
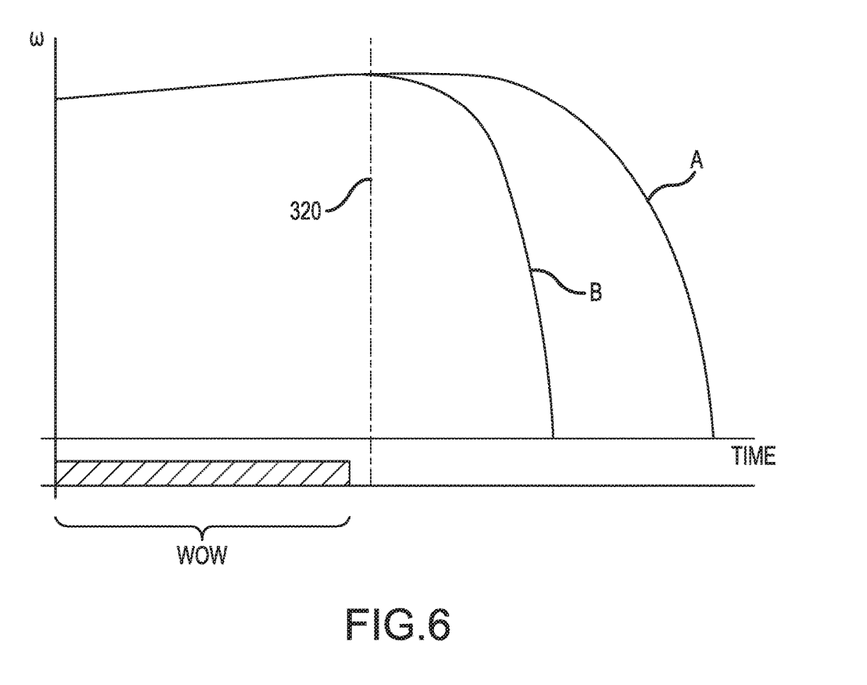
FIG. 6 illustrates spindown of a wheel having a new tire and brake versus spindown of a wheel having a worn tire and brake, in accordance with various embodiments.

Referring briefly to FIG. 6, angular velocity profiles for a new wheel assembly A, having a new tire and/or brake, and a worn wheel assembly B, having a worn tire and brake, is illustrated, in accordance with various embodiments. FIG. 6 generally shows that the natural spindown for new wheel assembly A is different than the natural spindown for worn wheel assembly B. A threshold based on a moving average better accounts for the changing velocity profiles caused by the slow wear on tires and brakes over time. For example, a dragging brake detection threshold that is based on a velocity profile of new wheel assembly A would be less accurate for detecting a dragging brake in a worn wheel assembly B. A threshold based on a moving average more accurately detects a dragging brake over the life of the tires and brakes. Where worn tires and brakes are replaced and the velocity profile changes of the wheel assembly changes, a threshold based on a moving average still provides a conservative test for a dragging brake.

Returning to FIG. 3B, an aircraft may take an action in response to the lowest angular velocity sum that is beyond a given threshold value. In step 356, controller 110 may produce an output signal indicative of a dragging brake to another aircraft component. For example, controller 110 may send a dragging brake signal to a cockpit component. A cockpit component may be any system that delivers information to the cockpit. For example, a cockpit component may cause a light, icon, graphic, or other visual or audio representation to appear in the cockpit to indicate a dragging brake. The aircraft pilot or other crew member may then take remedial action based upon the dragging brake signal. For example, a pilot may delay landing gear retraction until it is believed that the dragging brake has cooled.

Figure 7:
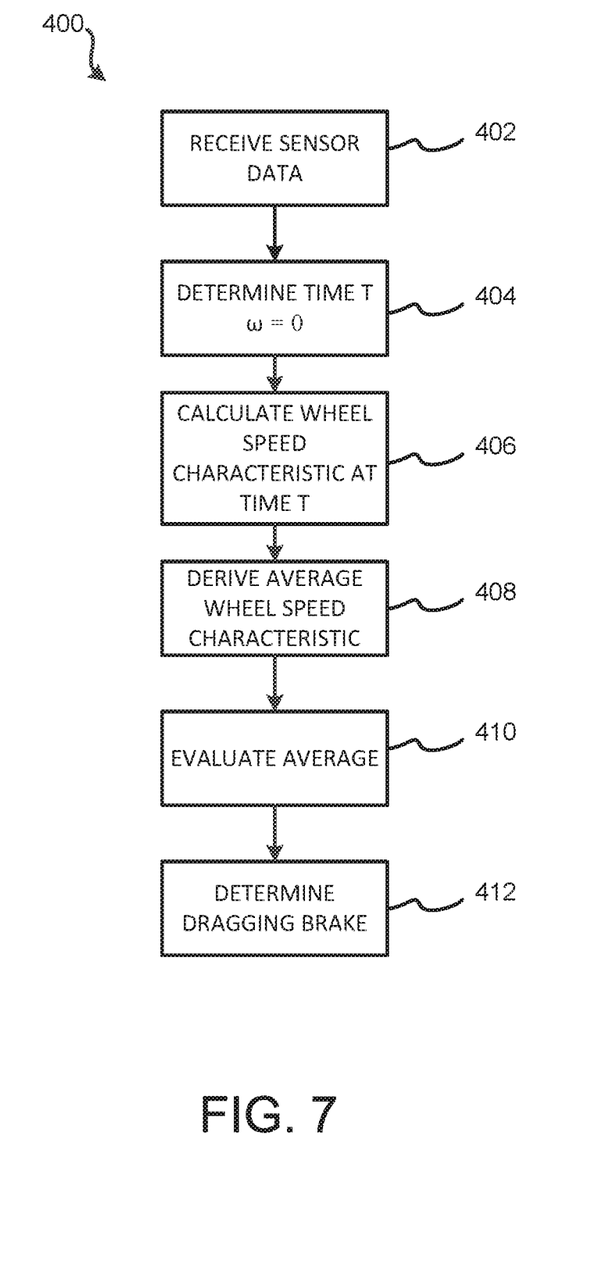
FIG. 7 illustrates a method of detecting a dragging brake, in accordance with various embodiments.

Referring now to FIG. 7, a method 400 for determining or detecting a dragging brake is shown, in accordance with various embodiments. Controller 110 may be capable of carrying out the steps of FIG. 7. Generally, method 400 may be initiated after WOW sensor 240 of landing gear indicates that weight is off wheels, i.e. WOFFW is true. Method 400 may be performed by controller 110 and may include the steps of receiving sensor data (step 402), determining a time $T_i$ that a wheel speed is zero ($\omega=0$) (step 404), calculating a wheel speed characteristic at time $T_i$ (step 406), deriving an average of the wheel speed characteristic (step 408), evaluating the average (step 410), and determining a dragging brake (step 412).

Step 404 may comprise determining a time T that one of the plurality of wheels reaches a wheel speed of zero. The time T may be a time Ti that a first wheel reaches a wheel speed of zero, a time $T_f$ that a final wheel reaches a wheel speed of zero or a time that any wheel of the landing gear reaches a wheel speed of zero. The wheel with a wheel speed of zero at time T may be identified as the selected wheel.

Step 406 may comprise calculating a wheel speed characteristic for each of a plurality of wheels 202, 204, 222, 220 of the landing gear. Step 406 may comprise determining a wheel speed at time T, wherein the wheel speed characteristic may comprise an angular velocity of a wheel or a wheel speed. Step 406 may comprise calculating a time duration for each wheel to completely spindown until the wheel speed is zero, wherein the wheel speed characteristic may comprise a wheel spindown duration or a wheel stop time.

Step 408 may comprise identifying a lowest value of the wheel speed characteristic and omitting the lowest value, and deriving an average wheel speed characteristic. Step 408 may comprise calculating a wheel speed characteristic of the other wheels of the plurality of wheels at time $T_i$, omitting the selected wheel identified in step 404. Step 408 may comprise determining an average wheel speed characteristic for the present takeoff, and may further include determining a moving average of the wheel speed characteristic based on the present takeoff and past takeoffs.

Step 410 may comprise evaluating the average wheel speed characteristic for the present takeoff. In various embodiments, step 410 may include comparing the average wheel speed characteristic to the wheel speed characteristic of the selected wheel identified in step 404. In various embodiments, step 410 may include comparing the average wheel speed characteristic to the lowest value, which may be the shortest time duration for wheel to reach a wheel speed of zero. Step 410 may include evaluating an average time duration for the wheels to stop spinning compared to the time duration between WOFFW until time T, which may be the time duration for the selected wheel identified in step 404 stop spinning. Step 410 may include evaluating an average wheel speed at time T to a wheel speed of zero. In various embodiments, step 410 may further comprise calculating a difference between the wheel speed characteristic and the wheel speed characteristic of the selected wheel identified in step 404. Step 410 may comprise evaluating the difference against a threshold.

Step 412 may comprise determining a dragging brake by evaluating the average wheel speed characteristic against a threshold, and determining if the average wheel speed characteristic at time T is outside the threshold. If the result is outside the threshold, then it can be concluded that a dragging brake is occurring, and if the result is inside the threshold, then it can be concluded that a dragging brake is not occurring. In response to detecting a dragging brake, controller 110 may send a notification signal to alert the presence of a dragging brake.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing gear assembly, comprising:
   a first wheel and a second wheel;
   a first wheel sensor coupled to the first wheel and a second wheel sensor coupled to the second wheel;
   a controller coupled to the first wheel sensor and the second wheel sensor; and
   a tangible, non-transitory memory configured to communicate with the controller, the tangible, non-transitory memory having instructions stored thereon that, in response to execution by the controller, cause the controller to perform operations comprising:
      receiving, by the controller, data from the first wheel sensor and the second wheel sensor;

calculating, by the controller, a wheel speed characteristic for each of the first wheel and the second wheel based on the data;
identifying, by the controller, a lowest value for the wheel speed characteristic of the first wheel and the second wheel;
determining, by the controller, a moving average for the wheel speed characteristic of the first wheel and the second wheel;
comparing, by the controller, the lowest value to the moving average of the first wheel and the second wheel;
determining, by the controller, whether the lowest value for the wheel speed characteristic of the first wheel and the second wheel indicates a dragging brake; and
generating, by the controller, a signal based on the dragging brake being present.

2. The landing gear assembly of claim 1, wherein the operations further comprise:
determining, by the controller, an average wheel speed characteristic for a present takeoff, wherein the lowest value is excluded from the average; and
storing, by the controller, the average wheel speed characteristic for the present takeoff, wherein the moving average is based on the average wheel speed characteristic for the present takeoff and is based on a stored average wheel speed characteristic from a past takeoff.

3. The landing gear assembly of claim 2, wherein the operations further comprise evaluating, by the controller, the lowest value and the moving average against a threshold, wherein the threshold is based on the moving average.

4. The landing gear assembly of claim 3, wherein the threshold is 50% to 70% of the moving average.

5. The landing gear assembly of claim 1, wherein the data includes a displacement, velocity, or acceleration, and wherein the wheel speed characteristic is a summation of the data during a time interval.

6. The landing gear assembly of claim 5, wherein the time interval begins after takeoff and ends prior to a gear retract braking.

7. An article of manufacture including a non-transitory, tangible computer readable storage medium having instructions stored thereon that, in response to execution by a controller, cause the controller to perform operations comprising:
receiving, by the controller, data from a first wheel sensor coupled to a first wheel of a landing gear and a second wheel sensor coupled to a second wheel of the landing gear;
calculating, by the controller, a wheel speed characteristic for the first wheel and the second wheel;
identifying, by the controller, a lowest value for the wheel speed characteristic of the first wheel and the second wheel;
determining, by the controller, a moving average for the wheel speed characteristic of the first wheel and the second wheel;
comparing, by the controller, the lowest value to the moving average of the first wheel and the second wheel;
determining, by the controller, whether the lowest value for the wheel speed characteristic of the first wheel and the second wheel indicates a dragging brake; and
generating, by the controller, a signal based on the dragging brake being present.

8. The article of manufacture of claim 7, wherein the operations further comprise:
determining, by the controller, an average wheel speed characteristic for a present takeoff, wherein the lowest value is excluded from the average; and
storing, by the controller, the average wheel speed characteristic for the present takeoff, wherein the moving average is based on the average wheel speed characteristic for the present takeoff and is based on a stored average wheel speed characteristic from a past takeoff.

9. The article of manufacture of claim 8, wherein the operations further comprise evaluating, by the controller, the lowest value and the moving average against a threshold, wherein the threshold is based on the moving average.

10. The article of manufacture of claim 9, wherein the threshold is 50% to 70% of the moving average.

11. The article of manufacture of claim 7, wherein the wheel speed characteristic is a summation of an angular velocity during a time interval.

12. The article of manufacture of claim 11, wherein the time interval begins after takeoff and ends prior to a gear retract braking.

13. A method for detecting a dragging brake, the method comprising:
receiving, by a controller, data from a first wheel sensor and a second wheel sensor of a landing gear;
calculating, by the controller, a wheel speed characteristic for each of a first wheel and a second wheel of the landing gear based on the data;
identifying, by the controller, a lowest value for the wheel speed characteristic of the first wheel and the second wheel;
determining, by the controller, a moving average for the wheel speed characteristic of the first wheel and the second wheel;
comparing, by the controller, the lowest value to the moving average of the first wheel and the second wheel; and
determining, by the controller, whether the lowest value for the wheel speed characteristic indicates a dragging brake of the first wheel and the second wheel; and
generating, by the controller, a signal based on the dragging brake being present.

14. The method of claim 13, further comprising:
determining, by the controller, an average wheel speed characteristic for a present takeoff, wherein the lowest value is excluded from the average; and
storing, by the controller, the average wheel speed characteristic for the present takeoff, wherein the moving average is based on the average wheel speed characteristic for the present takeoff and is based on a stored average wheel speed characteristic from a past takeoff.

15. The method of claim 14, further comprising evaluating, by the controller, the lowest value and the moving average against a threshold, wherein the threshold is based on the moving average.

16. The method of claim 15, wherein the threshold is 50% to 70% of the moving average.

17. The method of claim 13, wherein the wheel speed characteristic is a summation of an angular velocity during a time interval.

18. The method of claim 17, wherein the time interval begins after takeoff and ends prior to a gear retract braking.

* * * * *